UNITED STATES PATENT OFFICE.

BOTHO SCHWERIN, OF FRANKFORT-ON-THE-MAIN, GERMANY, ASSIGNOR TO ELEKTRO-OSMOSE AKTIENGESELLSCHAFT, (GRAF SCHWERIN GESELLSCHAFT,) OF FRANKFORT-ON-THE-MAIN, GERMANY, A CORPORATION.

PROCESS FOR THE EXCHANGE OF IONS ADSORBED BY COLLOIDS.

1,120,551. Specification of Letters Patent. Patented Dec. 8, 1914.

No Drawing. Application filed April 24, 1914. Serial No. 834,266.

*To all whom it may concern:*

Be it known that I, BOTHO SCHWERIN, a subject of the German Emperor, residing at Frankfort-on-the-Main, Germany, have invented certain new and useful Improvements in Processes for the Exchange of Ions Adsorbed by Colloids, of which the following is a specification.

It is known that certain colloids adsorb ions from solutions of salts. Electronegative colloids adsorb basic ions, while electropositive colloids adsorb acid ions, and it is known that this adsorption may be selective. It is also known that such adsorptions may be deadsorbed by the electric current and simultaneously fractionated so that the adsorbed matters are liberated and recovered. By the present invention ions adsorbed in this manner may be exchanged for other ions by treating the adsorption compound with solutions of electrolytes. This exchange can be made selective by suitable choice of salt solution and concentration thereof, so that fractionation of the ions can be achieved. This method is important in all cases in which it is desired to separate and to isolate such substances as, for instance, closely related elements or rare earths, whose chemical behavior is so nearly identical that they can be separated from each other only with difficulty.

Solutions of electrolytes to be used in this invention are preferably neutral or acid solutions of salts. In the case of electronegative colloids an exchange of bases may be effected, and an exchange of acid residues in the case of electropositive colloids, and it has been found that the strongest electropositive bases exhibit in highest degree the tendency to exchange with other bases. The potential series permits apparently very great variation.

When it has been ascertained which salt solution may be best used for de-adsorption this solution may advantageously be used for selective adsorption. In this manner it is possible to insure that the ion which is to be de-adsorbed is adsorbed only in small degree and thus the further de-adsorption in accordance with this invention becomes more easy.

As an example of the invention, a manganese peroxid barium-radium-adsorption made in the manner prescribed by Professor E. Ebler of Heidelberg, is thoroughly washed with boiling water and filtered. The adsorption is now treated with a solution of 10 grams of aluminium chlorid per liter, six times in succession in the following manner:—The adsorption compound is held suspended with aid of a stirrer, for a long time in 1000 c. c. of the aforesaid solution, then the whole is boiled with continued stirring and finally filtered, the residue on the filter being washed with water. Quantitative estimation of the radium and barium in the original adsorption compound, in the total washings and in the final manganese peroxid adsorption, shows that a part of the barium and radium adsorbed in the manganese peroxid has been de-adsorbed and the relationship between the barium and the radium has been changed; expressed in percentages the new relationship is as follows:—

|  | Radium. | Barium. |
|---|---|---|
| Original adsorption compound | 100 | 100 |
| Total washings | 87.5 | 11.6 |
| Final manganese peroxid product | 12.5 | 88.4 |

The concentration of the radium with respect to the barium adsorbed with it amounted in the original adsorption compound to $9.87 \times 10^{-5}$ per cent. radium metal, whereas in the final product it is $6.95 \times 10^{-4}$ per cent. radium metal.

The following example will also serve to illustrate the invention:—53.5 grams of ammonium chlorid are dissolved in a liter of water. In this solution are suspended 10 grams of a manganese peroxid barium-radium adsorption compound of known content in a very fine state of subdivision and the whole is boiled for some minutes. In the filtered solid matter there was present of the originally adsorbed barium and radium,

| Barium | 32.7 per cent. |
|---|---|
| Radium | 64.7 " " |

In the adsorption compound the radium-barium concentration was $1.66 \times 10^{-4}$ per cent. radium metal. After de-adsorption it amounted to $3.26 \times 10^{-4}$ per cent. radium metal.

Having now described the nature of my said invention and the best means I know of carrying the same into practical effect, I claim:—

1. A process for the exchange of ions adsorbed by colloids, which process consists in treating the colloid-adsorption with a suitable solution of an electrolyte for the purpose of isolating and separating substances which can be chemically separated only with difficulty.

2. A process for the exchange of ions adsorbed by colloids, which process consists in treating the colloid-adsorption with a solution of an electrolyte which effects a selective exchange of the ions.

In testimony whereof I affix my signature in presence of two witnesses.

BOTHO SCHWERIN.

Witnesses:
 JEAN GRUND,
 HEATON W. HARRIS.